US012633130B2

(12) United States Patent
Bayzidi et al.

(10) Patent No.: US 12,633,130 B2
(45) Date of Patent: May 19, 2026

(54) METHOD, PROCESSOR CIRCUIT AND COMPUTER-READABLE STORAGE MEDIUM FOR PEDESTRIAN DETECTION BY A PROCESSOR CIRCUIT OF A MOTOR VEHICLE

(71) Applicant: Volkswagen Aktiengesellschaft, Wolfsburg (DE)

(72) Inventors: Yasin Bayzidi, Braunschweig (DE); Fabian Hüger, Wolfenbüttel (DE); Jan David Schneider, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 272 days.

(21) Appl. No.: 18/332,680

(22) Filed: Jun. 9, 2023

(65) Prior Publication Data

US 2023/0410533 A1     Dec. 21, 2023

(30) Foreign Application Priority Data

Jun. 17, 2022     (DE) .......................... 102022115189.1

(51) Int. Cl.
*G06V 20/58*          (2022.01)
*G06V 10/26*          (2022.01)
(Continued)

(52) U.S. Cl.
CPC .............. *G06V 20/58* (2022.01); *G06V 10/26* (2022.01); *G06V 10/40* (2022.01); *G06V 10/70* (2022.01);
(Continued)

(58) Field of Classification Search
CPC ........ G06V 10/26; G06V 10/40; G06V 10/70; G06V 10/763; G06V 10/774; G06V 10/806; G06V 10/82; G06V 20/58; G06V 40/10
See application file for complete search history.

(56) References Cited

U.S. PATENT DOCUMENTS

2020/0326667 A1* 10/2020 Ahuja ..................... G06N 3/047
2021/0407107 A1* 12/2021 Lee ......................... G06V 10/74
2023/0326215 A1* 10/2023 Yu ........................... G06V 10/62
                                                                701/28

OTHER PUBLICATIONS

C. Cao, Y. Wang, J. Kato, G. Zhang and K. Mase, "Solving Occlusion Problem in Pedestrian Detection by Constructing Discriminative Part Layers," 2017 IEEE Winter Conference on Applications of Computer Vision (WACV), Santa Rosa, CA, USA, 2017, pp. 91-99, doi: 10.1109/WACV.2017.18. (Year: 2017).*

(Continued)

*Primary Examiner* — Michael J Vanchy, Jr.
(74) *Attorney, Agent, or Firm* — Seed Intellectual Property Law Group LLP

(57) ABSTRACT

The disclosure relates to a method for pedestrian detection in a processor circuit of a motor vehicle, wherein an image data set describing an image of an environment of the motor vehicle is received from an environment sensor, and a machine learning model (ML model) is used to determine bounding boxes with potential images of pedestrians using the image data set, and from image data of the image data set the at least one ML model extracts feature data of image features and a detection of a completely or partially depicted pedestrian is carried out within a bounding box using the image features contained therein by way of a classifier of the at least one ML model, and the bounding box depicting the pedestrian is identified by a detection signal as the result of the detection.

12 Claims, 2 Drawing Sheets

(51) Int. Cl.
  G06V 10/40          (2022.01)
  G06V 10/70          (2022.01)
  G06V 10/762         (2022.01)
  G06V 10/774         (2022.01)
  G06V 10/80          (2022.01)
  G06V 10/82          (2022.01)
  G06V 40/10          (2022.01)
(52) U.S. Cl.
  CPC .......... G06V 10/763 (2022.01); G06V 10/774
          (2022.01); G06V 10/806 (2022.01); G06V
          10/82 (2022.01); G06V 40/10 (2022.01)

(56)                    References Cited

OTHER PUBLICATIONS

Ning et al., "Survey of pedestrian detection with occlusion," Complex & Intelligent Systems 7(1):577-587, Oct. 12, 2020.
Ouyang et al., "A Discriminative Deep Model for Pedestrian Detection with Occlusion Handling," 2012 IEEE Conference on Computer Vision and Pattern Recognition, Providence, RI, USA, Jun. 16-21, 2012, pp. 3258-3265.
Zhang et al., "Occlusion-Aware R-CNN: Detecting Pedestrians in a Crowd," Computer Vision—ECCV 2018, Munich, Germany, Sep. 8-14, 2018, pp. 657-674.

* cited by examiner

METHOD, PROCESSOR CIRCUIT AND COMPUTER-READABLE STORAGE MEDIUM FOR PEDESTRIAN DETECTION BY A PROCESSOR CIRCUIT OF A MOTOR VEHICLE

BACKGROUND

Technical Field

The disclosure relates to a method for pedestrian detection in a controller of a motor vehicle. The disclosure also relates to a processor circuit for carrying out the method and a computer-readable storage medium to enable a processor circuit to carry out the method.

Description of the Related Art

Pedestrian detection can determine, with the aid of at least one machine learning model (ML model), on the basis of image data of a respective camera image or image data set, i.e., a respective imaging of the environment, whether and where a pedestrian, such as a foot passenger, is depicted in the respective camera image of the environment. From this, it is possible to determine the relative position of the pedestrian to the motor vehicle by way of a converting of a sensor coordinate system of the environment sensor into an absolute coordinate system of the motor vehicle. This can be signaled to an automated driving function of the motor vehicle, which can then compute a driving trajectory of the motor vehicle for a collision-free passing of the pedestrian. The automated driving function can be, for example, a driver assist function (such as a lane-holding assist and/or a parking assist) and/or an autonomous driving function (autopilot), which can plan a driving trajectory for the automated, collision-free guidance of the motor vehicle when it is known where in the environment pedestrians are located, for example.

Corresponding prior art for this is known for example from the following scientific publications:

Shifeng Zhang, Longyin Wen, Xiao Bian, Then Lei, and Stan Z. Li, "Occlusion-aware R-CNN: Detecting Pedestrians in a Crowd," European Conference on Computer Vision-ECCV 2018;

Wanli Ouyang and Xiaogang Wang, "A Discriminative Deep Model for Pedestrian Detection with Occlusion Handling," IEEE, 2012; and Chen Ning, Li Menglu, Yuan Hao, Su Xueping, Li Yunhong, "Survey of pedestrian detection with occlusion," Complex & Intelligent Systems, 2021.

An important circumstance in the detecting of pedestrians on the basis of images of the environment is the fact that pedestrians are not always visible with their entire body, but instead there may be a concealment (occlusion), for example if several pedestrians are standing alongside each other and/or one pedestrian is standing behind an object, such as the post of a traffic sign. A pedestrian detection based on at least one machine learning model may fail here, in that such a pedestrian will not be detected, as is also described in the mentioned publications (the occlusion problem). The additional operation of further ML models which are trained for the detecting of partly concealed pedestrians, i.e., only a partial portion of whom is visible, is avoided in the context of pedestrian detection in a motor vehicle because a corresponding additional computing power would be needed, which is generally not available in a processor circuit of a controller of a motor vehicle.

BRIEF SUMMARY

Embodiments of the disclosure provide a way of efficiently recognizing, for an image data set, whether an only partially visible pedestrian is also depicted therein.

As one embodiment, the disclosure encompasses a method for operating or carrying out a pedestrian detection in a processor circuit of a motor vehicle. Such a processor circuit can be formed by a controller or an assemblage of multiple controllers of the motor vehicle.

The pedestrian detection, in known manner, is based on receiving at least one image data set (i.e., one camera image or a corresponding sequence of images) from at least one environment sensor of the motor vehicle. Such an individual image data set describes a respective imaging or an image or a snapshot of the environment of the motor vehicle. The at least one environment sensor can provide for this one or more environment cameras, as is known. The image data set, for example, can alternatively be a single image from a video data stream.

The method starts by extracting feature data of image features from the image data of the image data set by way of a feature extraction unit of the at least one ML model in the manner known from the prior art by way of at least one machine learning model (ML model). The individual pixels or image points of the image are thus combined or examined to see whether they represent at least one predetermined image feature, such as a structure or a texture or a pattern. One example of such a feature extraction is an edge detection.

Furthermore, the method is based on the fact that it is known from the prior art how to determine bounding boxes or encompassing contours in the respective image or the respective imaging (i.e., the image data of the image data set) which encompass or bound off an image region containing a potential image of a pedestrian. Such bounding boxes can be determined with the aid of the described image features and/or by way of a previous part of the at least one ML model. Such a bounding box constitutes a "hypothesis" or a prior detection based on the fact that image features have been recognized or are contained in the image region such that, taken together, make it probable that a pedestrian is imaged or that at least one object (of an as yet unknown object class) is contained in the image above a given probability limit value. Within the respective bounding box, a detection or classification of a completely or predominantly imaged pedestrian (if indeed a person or a pedestrian in general is imaged in the bounding box) is then performed with the aid of the image features from the respective bounding box by way of a classifier unit of the at least one ML model. Thus, if image features are present in the respective bounding box such as represent a completely visible pedestrian, the classifier unit will respond with a detection result indicating the presence or the recognition of such a pedestrian (otherwise preferably not).

A classifier unit has a detection threshold above which a classifier unit can also recognize a pedestrian within a bounding box when they are imaged not completely, but at least predominantly, for example by more than 70 percent or in general by more than a given minimum fraction. The minimum fraction may lie in the range of 65 to 90 percent, to give an example. Thus, it is enough for the classifier unit if a pedestrian is visible by a corresponding predominant portion.

As the detection result of the detection by the classifier unit, the respective bounding box is then identified or marked for which the classifier unit has recognized or classified an imaged pedestrian. The respective bounding box can be identified by a detection signal. Hence, all those bounding boxes are known for which the classifier unit has recognized the presence or the imaging of a pedestrian. The detection signal can indicate, e.g., an ID of the bounding box and/or coordinates, to give only some examples.

As already mentioned, such a classifier unit has a detection threshold, however, so that when a pedestrian is only partly imaged in a bounding box, and thus less of the pedestrian can be seen than is required by the detection threshold of the classifier unit, that pedestrian will not be recognized by the classifier unit. We then have the aforementioned effect of concealment or occlusion, that is, the pedestrian goes undetected by the classifier unit.

In order to provide an additional checking for the presence of the occlusion problem, which also detects those pedestrians who have gone undetected by the actual classifier unit, it is now provided according to the disclosure that for some or all of the bounding boxes and/or for additionally formed bounding boxes (as will be further explained below) each time the image features contained or encompassed therein may point to an overlooked pedestrian.

No specialized classifier unit of a ML model, such as an artificial neural network, is required for this, but instead the image features are combined to form a feature vector so that they can be checked in a low-cost manner. Thus, the image features are organized in a vector or represented by this. This feature vector constitutes a point in a feature space. The number of dimensions of this feature space corresponds, as is known, to the number of vector components of the feature vector. In this feature space, statistical distribution models are defined, which define or indicate for each point of the feature space whether or with what probability this point of the feature space (i.e., the feature vector describing the point) represents an imaging of a partial portion of a pedestrian and/or the body of a person, i.e., a thus far undetected pedestrian.

In other words, multiple statistical distribution models are defined, each of which models a statistical distribution of image features of an only partly visible pedestrian and/or the body of a person only visible in a partial portion, wherein the statistical distribution divides up the feature space in which the described image features are combined to form a respective feature vector. By "partial portion" is meant here that the distribution models are based on such feature vectors as represent a non-predominant imaging of the pedestrian, i.e., for example only a single part of the body or a concealment of the pedestrian by more than an "occlusion fraction" which may lie in the range of 25 percent to 80 percent. For example, one distribution model may thus represent only one foot and/or another distribution model only one hand and/or another distribution model only a head of a person, in the case of a person detection. A distribution model can also represent for example a torso or a pair of legs of a person, i.e., more than only one limb. In the case of a motor vehicle, a partial portion may be only one wheel well with wheel or a side view of only one trunk space.

A distance metric used to determine the distance of the feature vector from the respective distribution model can be based for example on a probability value, which the statistical distribution model can put out for the respective feature vector. The distance metric can also be a binary metric which indicates whether or not an affiliation exists. For this, the statistical distribution model can be for example (for probability indications) a Gaussian kernel distribution density or (in the case of a binary model) a Support Vector Machine (SVM). But a statistical distribution model based on an artificial neural network for example can also be used as the classifier, requiring only slight computing expense thanks to the use of a correspondingly short feature vector.

Hence, there now exists a distance value for a feature vector of the image features of a bounding box and regarding each distribution model, indicating how similar the feature vector is to the distribution model or to that partial portion of a pedestrian or bodily region of a person that is represented by the respective distribution model. The distance value is compared to a given threshold value or trigger value and if the distance value to one of the distribution models is smaller than the threshold value according to the comparison, a signal is sent that a pedestrian has gone undetected in the classifier unit, being now detected with the aid of the distribution model. Namely, if the distance value is smaller than the threshold value, there exists a correspondingly large similarity to or affiliation of the feature vector with the distribution model, that is, the feature vector represents with a correspondingly large probability a partial portion of a pedestrian or bodily region of a person and/or a human body.

The disclosure affords the benefit that one can determine, with relatively slight computing expense, namely, by calculating a feature vector and comparing it to several distribution models, whether a pedestrian has been overlooked by the classifier unit of the at least one ML model in an image data set, because only a partial portion of the pedestrian is visible or depicted, in particular, one which is smaller than the detection threshold of the classifier unit.

The disclosure can also be used for traffic participants other than pedestrians, i.e., also for motor vehicles and/or bicycle riders, i.e., for a traffic participant detection. The disclosure can also be used for other stationary traffic infrastructure objects, i.e., also for traffic signs, lane markings, traffic signals (traffic lights), i.e., for a traffic infrastructure detection. In general, the disclosure can be used for traffic objects, i.e., for traffic participants and traffic infrastructure objects, i.e., for a traffic object detection.

Thus, when we speak here of a pedestrian it may also mean a traffic participant of a different type (a motor vehicle and/or a bicycle rider) and/or a traffic infrastructure object. Thus, in general, it need not mean only a pedestrian, but it can also mean a traffic object in general.

The disclosure also encompasses modifications which produce additional benefits.

The described bounding boxes, which are generated as hypotheses or suggestions or input data for the classifier unit, may be very numerous when using an algorithm of the prior art, for example, there can be more than 100 or even more than 1000 bounding boxes per imaging or image data set. In order not to have to calculate a feature vector for all the bounding boxes and to compare it with the statistical distribution models, one modification of the disclosure calls for eliminating those bounding boxes for which the classifier unit has recognized any way that they depict a pedestrian. Thus, the detection result or the identification result of the classifier unit is excluded because no pedestrian could have been overlooked there. Furthermore, those bounding boxes are also eliminated for which it is recognized that they intersect by more than a given minimum area fraction with a bounding box which depicts a pedestrian according to the classifier unit. The minimum fraction may lie in the range of 80 percent to 99 percent. This is based on the fact that algorithms of the prior art by which bounding boxes are determined also put out or signal multiple mutually staggered bounding boxes for the same individual pedestrian. All these bounding boxes can be eliminated if the classifier unit reports for one of them that a pedestrian is depicted therein.

Yet in order to prevent the classifier unit from reporting an individual pedestrian, yet overlooking a second partly concealed pedestrian behind them, a subtraction can also be provided, which subtracts or removes from a bounding box that area fraction which pertains to a bounding box with identified pedestrian. In other words, an overlap is removed, such as results between a bounding box with a pedestrian and another bounding box (for which no pedestrian has been identified as of yet). The non-overlapping portion is then described by at least one further bounding box. It may be necessary to define multiple additional bounding boxes if the bounding boxes need to have a predetermined basic shape, for example or in particular a rectangular shape. Thus, the distribution model can also detect, behind a recognized or detected pedestrian, the visible partial portion of yet another pedestrian who is otherwise concealed. The feature vector which is determined for a particular bounding box can provide for the arranging or listing of all image features from the bounding box. But it is preferably provided to reduce the length of the feature vector, since a large number of image features may be contained in a bounding box, especially more than 100, or more than 1000. Accordingly, one modification of the disclosure calls for forming the feature vector by combining the image features to form a temporary vector, that is, a vector encompassing all the image features. This temporary vector is reduced by way of a dimension-reducing imaging to form the feature vector. The feature vector thus has fewer vector components than the temporary vector. Suitable dimension-reducing imaging for this can be one of the following methods known in the prior art: multidimensional scaling (MDS), a greedy forward selection, a correlation-based feature selection.

It is provided especially preferably by one modification of the disclosure that the dimension-reducing imaging involves a transformation of the temporary vector by way of a principal component analysis. This yields the so-called principal components as the transformed vector. Then, for the dimension reduction, only a given partial number of the vector components from the transformed vector are used for the feature vector, i.e., fewer than all vector components. In particular, the first N principal components are used (N being a whole number). Thus, for example, a number N of the vector components of the feature vector can be reduced to fewer than 200, especially fewer than 100.

As already mentioned, it should be expected for the classifier unit, or it is intrinsic to this, that it has a detection threshold for pedestrians which indicates how many percent or what portion of the pedestrian must be visible in the bounding box in order for the classifier unit to even detect the pedestrian. Each of the distribution models is preferably designed such that it simulates such a partial portion lying beneath the detection threshold. Thus, by way of the distribution model, an image of a partial portion of a pedestrian can be recognized as belonging to a pedestrian when no detection can be done by the classifier unit on account of its detection threshold. For this, the particular distribution model can simulate with a corresponding feature vector of images of partial portions of the pedestrian. This can be done in known manner on the basis of histograms of correspondingly many feature vectors from training data sets, as shall be further described in the following.

In order to have a suitable starting point or a suitable place for generating or extracting of feature data of the image features, one modification of the disclosure calls for using, as the feature extraction unit, a convolution network (CNN—Convolutional Neuronal Network) as an artificial neural network. By way of such a feature extraction unit, it is possible to detect in an image or in pixels of an image of an environment those pixels which belong together and on the whole represent a particular pattern or a particular structure, such as edges and/or regions of a particular color or a particular color pattern and/or basic shapes, such as angles or corners or pairs of eyes, to name only some examples. The CNN contains corresponding filters by way of which the pattern or the structure can be located in the image by correlation.

As the classifier unit, such a feature extraction unit can be connected to a deep artificial neural network, DNN (Deep Neuronal Network), as is proposed in one modification of the disclosure. Such a DNN is also known as a FCNN (Fully Connected Neuronal Network). It assigns the respective extracted feature data to a detection class or a detection result, such as the prediction of whether or by what percent probability the group of the feature data in a bounding box represents a pedestrian.

The training of convolution networks and/or deep artificial neural networks can be done with an algorithm known in the prior art, such as the back propagation algorithm. For this, reference is made to the already described publications of the prior art.

According to one modification of the disclosure, the activation values of artificial neurons of at least one network layer of the feature extraction unit are used or determined as the feature data representing or describing the extracted image features. One such activation value is known to be (depending on the particular scientific terminology) the input value or output value of an activation function (such as a sigmoid function) of the particular artificial neuron. Such an activation value at an output layer or in the last or rear layers of a feature extraction unit already represents a complete or whole image feature, such as a single-color surface or an edge, to mention only some examples. In particular, the feature data can be picked off or read out in a region known as a "bottleneck" in a machine learning model from CNN and DNN, i.e., the transition region or the interface between these two networks.

If it is recognized by way of the statistical distribution model for a bounding box that there is still depicted therein an undetected pedestrian, i.e., an only partly depicted pedestrian, then a predetermined safety measure is triggered in the motor vehicle for this event of reporting the undetected pedestrian. In other words, the signaling of the undetected pedestrian may be coupled or related to such a safety measure. The safety measure provided can be, for example, that the automated driving function which receives the detection result regarding the pedestrian can reduce the driving speed of the motor vehicle and/or modify the planned driving trajectory or verify it to see whether it refers to the undetected pedestrian and optionally steers the motor vehicle around the undetected pedestrian by adapting the driving trajectory.

The described statistical distribution models are used to carrying out the method. These can be generated in the already described manner on the basis of histograms for feature vectors showing persons depicted only partially or in a partial portion. To generate such histograms systematically, one modification of the disclosure calls for decomposing bounding boxes of completely depicted persons into partial portions for generating the distribution models from training data sets (i.e., images of environments with pedestrians) and combining the image features contained in the respective partial portion to form respective training feature vectors. The already described dimension-reducing imaging, e.g., PCA, can also be used for this. In particular, the training feature vectors are formed in the same way as the already described feature vectors, such as are used in the operation of the person detection, so that the same feature vectors are produced. The training feature vectors produce point clouds in the described feature space, or a point cloud is produced. The training feature vectors, or their points in the feature space, are divided into clusters by way of a cluster algorithm. For example, the K-Means algorithm can be used for this. Clusters can also be determined by way of a SVM (Support Vector Machine) regions. Each cluster represents or constitutes one of the described statistical distribution models. Thus, during the person detection if it is detected for a bounding box that its feature vector has a distance from one of the clusters or a cluster midpoint which is less than said threshold value, this feature vector will thus be assigned to the cluster, thereby deciding that a partial portion of a person is depicted by the feature vector and thus by the bounding box. Otherwise, the feature vector represents an undetected pedestrian. Thus, for example, a single leg or a pair of legs or a head can each be represented by a cluster. Hence, a detection or at least a suggestion of an undetected person can also be generated.

The disclosure also comprises the described processor circuit for a motor vehicle in order to carry out the method. The processor circuit can be realized by a controller or a group of multiple controllers in the motor vehicle. The processor circuit is adapted to carry out an embodiment of the method according to the disclosure. For this, the processor circuit can comprise at least one microprocessor and/or at least one microcontroller and/or at least one FPGA (Field Programmable Gate Array) and/or at least one DSP (Digital Signal Processor). Furthermore, the processor circuit can comprise program code, which is designed to carry out the embodiment of the method according to the disclosure when it is executed by the processor circuit. The program code can be saved in a data storage of the processor circuit.

For application cases or application situations which may occur in the method and which are not explicitly described here, it can be provided that an error reporting and/or a prompt to enter user feedback is put out according to the method and/or standard settings and/or a predetermined initial state are established.

In order to enable a traditional processor circuit of a motor vehicle to carry out the method, a computer-readable storage medium is also provided by the disclosure, having program instructions which, when executed by a processor circuit of a motor vehicle, cause it to carry out an embodiment of the method according to the disclosure regarding the pedestrian detection in the motor vehicle. A further claimed computer-readable storage medium has program instructions which, when executed by a computer, such as may be present at a manufacturer of controllers for motor vehicles and/or in a laboratory or in a workshop or which can be realized by a backend, causes this computer to carry out the described determination of training feature vectors and clusters thereof according to the described method. Such a computer-readable storage medium can thus be used to generate the statistical distribution models in a laboratory or at the manufacturer, which can then be used in a processor circuit of the motor vehicle to carry out the described method.

The disclosure also encompasses a motor vehicle, in which an embodiment of the described processor circuit is coupled to at least one environment vector of the motor vehicle for the receiving of image data sets and to an automated driving function for the providing of detection results to this driving function. The motor vehicle according to the disclosure is preferably configured as an automobile, especially a passenger car or truck, or as a passenger bus or motorcycle.

As a further solution, the disclosure also encompasses a computer-readable storage medium comprising program code which, when executed by a computer or a group of computers, can cause them to carry out an embodiment of the method according to the disclosure. The storage medium can be provided, e.g., at least partially as a non-volatile data storage (such as a flash memory and/or as an SSD—solid state drive) and/or at least partially as a volatile data storage (such as a RAM—random access memory). The storage medium can be realized in the processor circuit in its data storage. But the storage medium can also be operated for example as a so-called Appstore server on the internet. A processor circuit with at least one microprocessor can be provided by the computer or the group of computers. The program code can be provided as binary code or Assembler and/or as source code of a programming language (such as C) and/or as program script (such as Python).

The disclosure also encompasses the combinations of the features of the described embodiments. The disclosure thus also encompasses realizations each comprising a combination of the features of multiple described embodiments, as long as the embodiments were not described as being mutually exclusive.

BRIEF DESCRIPTION OF THE SEVERAL VIEWS OF THE DRAWINGS

In the following, exemplary embodiments of the disclosure shall be described.

DETAILED DESCRIPTION

The following explained exemplary embodiments involve preferred embodiments of the disclosure. In the exemplary embodiments, the components of the embodiments which are described each time constitute individual features of the disclosure to be viewed independently of each other, which also modify the disclosure independently of each other. Therefore, the disclosure will also cover other than the represented combinations of the features of the embodiments. Moreover, the described embodiments can also be supplemented by other of the already described features of the disclosure.

In the figures, the same reference numbers each time designate functionally equal elements.

Figure 1:
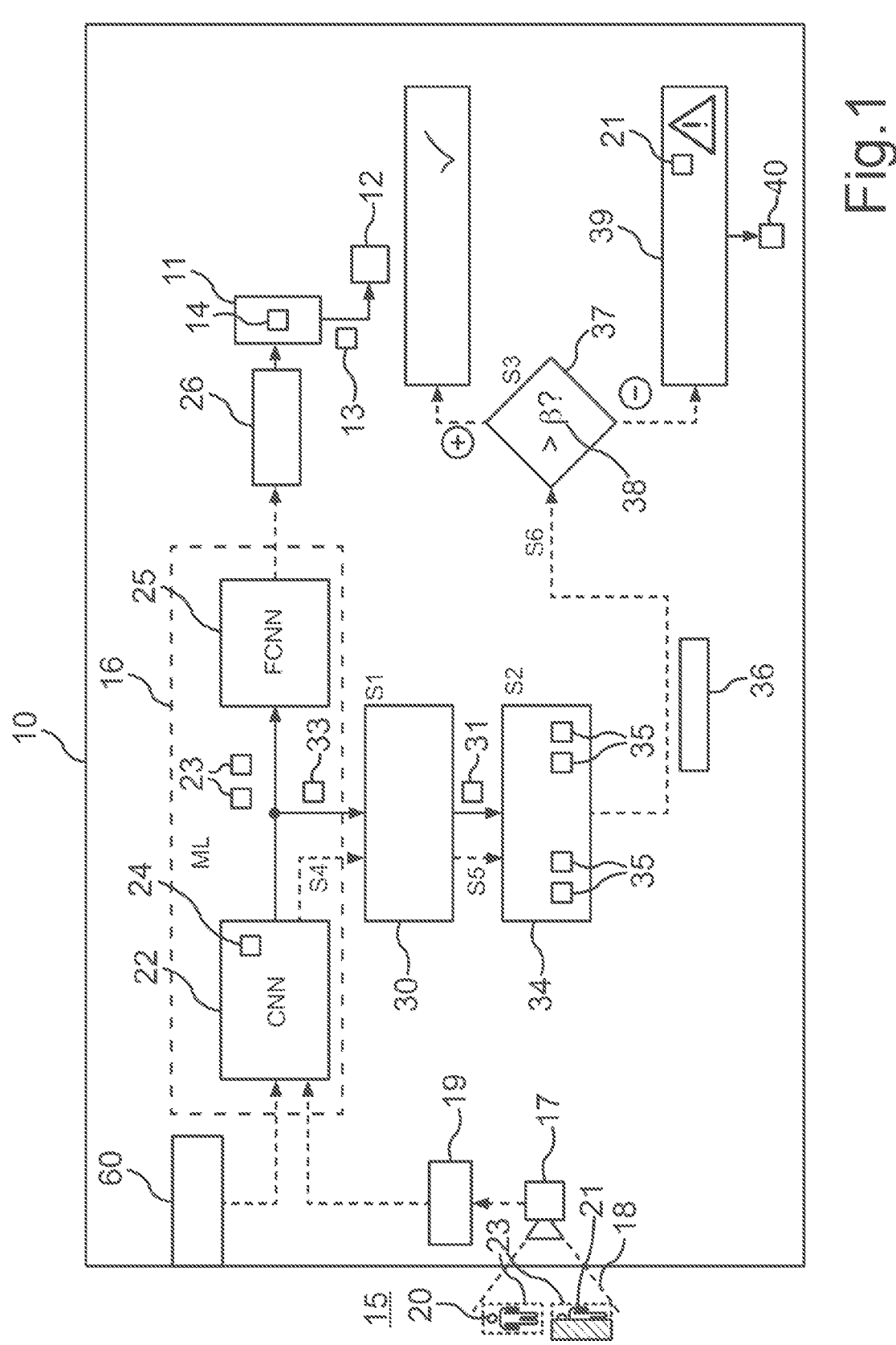
FIG. 1 shows a schematic representation of an embodiment of the motor vehicle according to the disclosure.

FIG. 1 shows a motor vehicle 10, which can be an automobile, especially a passenger car or truck. The motor vehicle 10 can have an automated driving function 11, by which actuators 12 of the motor vehicle 10 can be operated by way of a control signal 13 automatically or without involvement of the driver. The actuators 12 can be provided for the transverse control (steering) and/or longitudinal control (acceleration and braking) of the motor vehicle 10. Thus, by way of the control signal 13, the driving function 11 can guide the motor vehicle 10 by triggering the actuators 12 along a driving trajectory 14 which the driving function 11 can compute in order to guide the motor vehicle 10 collision-free through an environment 15, such as road traffic or a road network. In order to plan the driving trajectory 14, the driving function 11 can be connected to a pedestrian detection 16, which can be implemented by a machine learning (ML) model.

The pedestrian detection 16 can receive image data sets 19 from at least one environment sensor 17 of the motor vehicle 10, such as a camera, the detection region 18 of which can be pointed toward the environment 15, each time depicting the environment 15 with the persons or pedestrians 20, 21 potentially visible therein.

The ML model may comprise a feature extraction unit 22, which can be based on a convolution network CNN, for example. By way of the feature extraction unit 22, image features can be extracted from the image data sets 19, such as is known in itself for convolution networks or in general for computer vision processing of image data sets 19. In addition or alternatively, bounding boxes 23 can be determined with the aid of the image data sets 19, which bound or encircle those regions or picture areas of the images according to the image data sets 19 in which a person might be located as a pedestrian 20, 21 according to the feature-extracted image features 24. These are so-called hypotheses or suggestions. The image data of the individual bounding boxes 23 can be provided to a classifier unit 25, which can be based for example on a FCNN (Fully Connected Neuronal Network). The classifier unit 25 can produce a recognition result 26 in known manner on the basis of the image features 24 from the individual bounding boxes 23, indicating in which of the bounding boxes 23 a person is in fact located as a pedestrian 20, 21.

In the following, it shall be assumed for the further explanation that the fully visible pedestrian 20 can be detected by the classifier unit 25, being completely visible or depicted in the respective image data set 19. On the contrary, the pedestrian 21 is depicted only partially or only a partial portion of the pedestrian 21 is depicted and has been overlooked or not detected by the classifier unit 25 in the example. A pedestrian in this exemplary embodiment is a person.

The detection result or the recognition result 26 of the detection process can be reported to the driving function 11. The driving function 11 can use the position of the detected pedestrian 20 in the image according to image data sets 19 to ascertain the relative position of the pedestrian 20 in the environment 15 in relation to the motor vehicle and the plan the driving trajectory 14.

In order to see whether the classifier unit 25 has overlooked a pedestrian, for example the pedestrian 21, in addition to those bounding boxes 23 which do not contain or cover any of the detected pedestrians 20, 21 it is possible to determine a respective feature vector 31 by way of a dimension-reducing imaging 30. For this, the image features 24 of the respective bounding box 23 can be combined to form a preliminary vector 33, for example, which can be reduced in its dimension or length by way of the imaging 30 in order to generate the feature vector 31. As the imaging 30, a principal component analysis PCA (Principal Compound Analysis) can be used, for example.

The feature vector 31 can be compared in a distance calculation 34 with statistical distribution models 35 or it is possible to determine an affiliation value or a value for the probability of occurrence according to the respective statistical distribution model 35 for the feature vector 31. From this, a respective distance value 36 of the feature vector 31 in regard to the statistical distribution model 35 can be determined. The smallest distance value 36 can be used thereafter, since in particular only the smallest distance value 36 needs to be used for the further steps of the method. For example, the distance value 36 which is used can be the reciprocal of a probability value, producing the probability of occurrence of the feature vector 31 according to the respective statistical distribution model 35. The statistical distribution model 35 can be, for example, a Gaussian kernel distribution function, which can indicate a probability of occurrence for a feature vector 31. If a support vector machine, SVM, is used as the statistical distribution model 35, the detection result will be a binary distance value (belonging or not belonging).

In a threshold value comparison 37, the distance value 36 can be compared to a threshold value 38, indicated here as the Greek letter $\beta$. If the distance value is larger than the threshold value 38 (symbolized by a plus sign), there will be no match between the bounding box checked according to the feature vector 31 and one of the statistical distribution models 35 and therefore neither does the bounding box represent any partial portion of a pedestrian (symbolized by an "OK check mark").

On the contrary, if the distance value 36 in the threshold value comparison 37 is smaller than the threshold value 38 (symbolized by a minus sign), a signal 39 can be provided that an undetected or overlooked pedestrian is present in the image data set 19 on which the bounding box is based. For example, the signaling 39 can trigger the described safety measure 40, that is, the driving function 11 may reduce the driving speed of the motor vehicle 10 along the previously planned driving trajectory 14 or make sure that the driving speed is kept below a given maximum speed.

Figure 2:
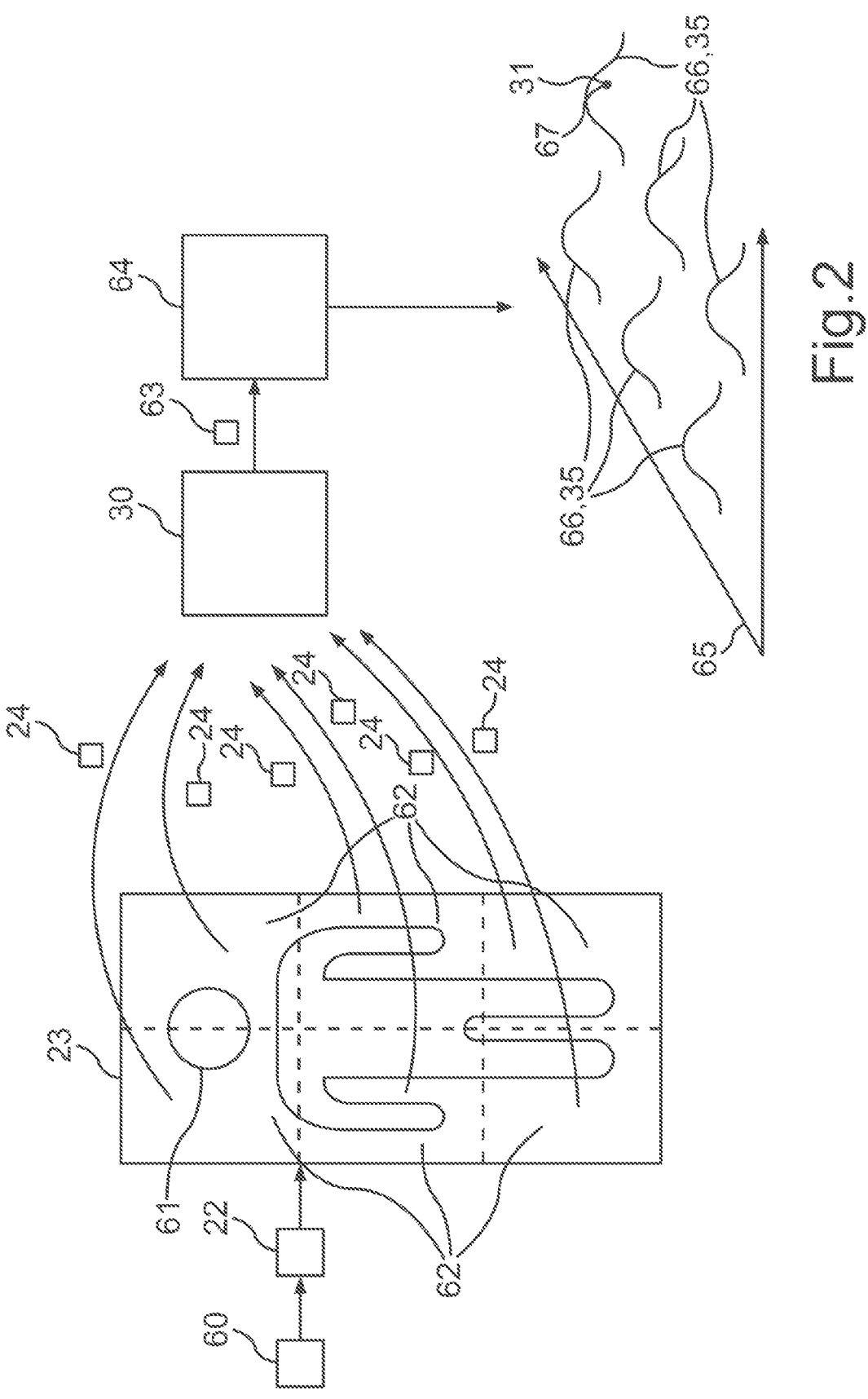
FIG. 2 shows a sketch to illustrate one embodiment of the method according to the disclosure.

FIG. 2 illustrates, for example, how the distribution models 35 can be formed and how the undetected pedestrian 21 can be determined with the aid of the feature vector 31 by way of the distribution model 35.

FIG. 2 shows (with reference to FIG. 1) how training data sets 60 (FIG. 1) can be analyzed in the same way as has already been described by way of the feature extraction unit 22. The training data sets 60 can be provided in already known manner with labeling data, that is, it can be known which bounding box 23 represents or depicts a fully visible person 61 as the pedestrian. Such a bounding box 23 can be decomposed or divided into partial portions 62, that is, the image features inside the bounding box 23 can be associated with the respective partial portion 62. It is known from the prior art that an image feature 24 is also associated with a location or a position within an image in an image data set 19.

The image features 24 of each partial portion 62 can now be transformed or mapped into training feature vectors 63 in the described manner by way of the dimension-reducing imaging. The trainings feature vectors 63 can be combined by way of a clustering algorithm 64 or cluster algorithm. In this way, multiple clusters 66 are produced in a feature space 65, each of which represents a distribution model 35. The feature space 65 is represented here, in simplified manner for the description, by a two-dimensional space (plane). For individual regions or for individual points in the feature space 65, the respective distribution model 35 can indicate whether and/or with what probability such a point in the feature space 65 belongs to the distribution model 35 or is produced or generated by it.

For example, if the bounding box 23 for the pedestrian 21 has been transformed or transferred to the feature vector 31, this feature vector 31 represents a point 67 in the feature space 65 which has a distance value 36 relative to the distribution model 35 that is smaller than the threshold value 38. Accordingly, the point 67 can be determined as belonging to the distribution model 35, that is, its cluster 66. Hence, in the threshold value comparison 37, it is found that an undetected pedestrian 21 is present and therefore the signaling 39 must be triggered or initiated.

In this way, an overall reliability metric is obtained for finding concealed data points based on their distance from the center of mass or geometrical center of the clusters from the training data.

Based on this, one obtains a system installed in the vehicle which uses a reference cluster model that was created in the backend on the basis of the training data set used for the optimization of the DNN (in general, the classifier unit) in order to verify whether the currently processed image contains concealed pedestrians.

In each phase of the detection and decision making process, predictions are made in the DNNs, and the reliability of such predictions is of critical importance on the whole for the automated driving system, since the upcoming decisions of the system may be influenced by these reliability values. In other words: if a prediction of a subsystem, e.g., the detection process, proves to be unreliable, the system must make alternative decisions in place of the unreliable decisions, or else the safety of the passengers or other traffic participants might be jeopardized. In the case of this patent, this algorithm checks the possibility of a concealed pedestrian being overlooked by the DNN.

The prior art thus far is based on computation-intense methods, which are not always easy to apply given the limited resources in the operational equipment, such as vehicles. On the other hand, their predictions are misleading when unfavorable interference is present, while they still provide a high degree of trust in the wrongly predicted data points. Our method is based on lightweight statistical models requiring only a fraction of the computing power which is needed by the main DNN, and thus they do not detract from the efficiency of the overall recognition system. Since the method is based on statistical analysis methods, the system engineers can furthermore establish decision making boundaries so as to rely on only a certain range of valid detections and to regard the rest as unreliable. This is especially helpful in establishing safe and reliable decision making areas where the DNN can provide good performance.

Furthermore, our method can also be used for the safety argument of detection DNNs, in which the DNNs are evaluated at a number of input data points with distances from their true class cluster centers and can generate evidence based on this.

An overview of a particularly preferred embodiment of the method is now given. The figures show that the method decides whether or not a prediction of the automated driving system in the vehicle is reliable. The decision as to whether or not a prediction of the automated driving system in the vehicle is reliable is made in the following six steps. Steps S1 to S3 are carried out during the design phase of the system in the backend, while steps S4 to S6 are performed during the running time in the vehicle, requiring a minimal computing power. The steps in particular are as follows:

(1) [In the backend] The activations of one or more CNN layers (or a similar encoder) are extracted for the entire training data set for the fully visible pedestrians. These are then divided into various random splits so as to cover a partial portion of the pedestrian each time. Each split is then simplified with linear dimensionality reduction methods such as principal component analysis (PCA), resulting in a simplified feature space, which can be divided into various classes. This model is very small and light, thanks to its linearity, so that it requires only minimal computing power. Consequently, at the end of this step many statistical distributions are extracted, based on different partitioning of the pedestrians, and these are used as a reference for the next steps.

(2) [In the backend] On the basis of the results from (1), a model is developed, forming a cluster for each split. This is then used to estimate a probability score, which defines the probability that a data point belongs to a cluster. This probability value is calculated such that the vehicle requires the least possible computing power.

(3) [In the backend] If required for the cluster method, a probability threshold value is defined for each cluster, representing the minimum probability that a data point belongs to this cluster or not.

(4) [In the vehicle] In the customary 2D object recognition methods, thousands of 2D "suggestions" are generated, being discarded in the later phases of the detection and only a few of them leading to the final result. Our algorithm uses these numerous 2D suggestions to extract the corresponding filter activations from the aforementioned CNN layer. These suggestions are then included in the narrower selection, in order to eliminate those which intersect with a pedestrian already detected by the main DNN. (The goal is to find the overlooked concealed pedestrians). Finally, they are transferred to the new space by the same PCA model as in (1) and are compared to the clusters formed in (2).

(5) [In the vehicle] The probability value of the results from (4) in regard to the partitioned clusters is estimated and the closest cluster is fed back.

(6) [In the vehicle] If the probability value estimated in step S5 is less than the threshold value calculated in step S3, the final prediction is then considered to be "a probably concealed pedestrian overlooked by the main pedestrian detector".

On the whole, the examples show how an additional checking for overlooked or undetected pedestrians can be provided for an automated driving function in a pedestrian detection process, which can be based on clusters (distribution models) in a reduced feature space and can therefore be carried out with less computing expense.

German patent application no. 102022115189.1, filed Jun. 17, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for pedestrian detection performed by a processor circuit of a motor vehicle, the method comprising:
    receiving at least one image data set describing an image of an environment of the motor vehicle from at least one environment sensor;
    determining a plurality of bounding boxes with one or more potential images of one or more pedestrians using at least one machine learning model (ML model) and the at least one image data set;

extracting feature data of image features from image data of the at least one image data set using the at least one ML model;

detecting a completely or partially depicted pedestrian within at least one of the plurality of bounding boxes using the at least one ML model and the image features;

determining one of the plurality of bounding boxes that intersects the at least one of the plurality of bounding boxes within which the completely or partially depicted pedestrian has been detected;

eliminating the one of the bounding boxes from the plurality of bounding boxes;

after the one of the bounding boxes is eliminated from the plurality of bounding boxes, determining a feature vector and a distance value of the feature vector by combining image features contained in the plurality of bounding boxes based on multiple statistical distribution models, wherein the image features of one partial portion of a pedestrian or a body of a person is modeled by each of the statistical distribution models;

comparing the distance value to a threshold value; and sending a signal indicating that a pedestrian has gone undetected if the distance value is less than the threshold value.

2. The method according to claim 1, wherein the method includes forming one or more additional bounding boxes based on the plurality of bounding boxes, and wherein the determining the feature vector and the distance value includes combining image features contained in the one or more additional bounding boxes and the plurality of bounding boxes.

3. The method according to claim 2, further comprising:

wherein at least one of the one or more additional bounding boxes is a non-overlapping portion of the one of the plurality of bounding boxes and the at least one of the plurality of bounding boxes within which the completely or partially depicted pedestrian has been detected.

4. The method according to claim 1, wherein the determining the feature vector includes combining the image features to form a temporary vector, and reducing the temporary vector.

5. The method according to claim 4, wherein the reducing the temporary vector includes transforming the temporary vector to form a transformed vector by way of a principal component analysis, and using a predetermined subset of vector components from the transformed vector for the feature vector.

6. The method according to claim 1, wherein each of the statistical distribution models simulates a partial portion situated below a detection threshold of a classifier of the at least one ML model.

7. The method according to claim 1, wherein the extracting feature data of image features is based on a convolution network, and the detecting the completely or partially depicted pedestrian within the at least one of the plurality of bounding boxes is based on a neural network.

8. The method according to claim 1, wherein activation values of artificial neurons of at least one network layer of the at least one ML model are determined as the feature data.

9. The method according to claim 1, further comprising:

triggering a predetermined safety measure in the motor vehicle if the distance value from one of the statistical distribution models is less than the threshold value.

10. The method according to claim 1, further comprising:

generating the statistical distribution models from training data sets;

decomposing at least one of the plurality of bounding boxes that completely depicts one or more pedestrians into partial portions;

combining image features contained in respective ones of the partial portions to form training feature vectors; and dividing the training feature vectors into clusters based on a cluster algorithm, wherein each of the clusters represents one of the statistical distribution models.

11. A processor circuit for a motor vehicle, comprising:

a processor; and a memory storing instructions that, when executed by the processor, cause the processing circuit to:

receive at least one image data set describing an image of an environment of a motor vehicle from at least one environment sensor;

determine a plurality of bounding boxes with one or more potential images of one or more pedestrians using at least one machine learning model (ML model) and the at least one image data set;

extract feature data of image features from image data of the at least one image data set using the at least one ML model;

detect a completely or partially depicted pedestrian within at least one of the plurality of bounding boxes using the at least one ML model and the image features;

determine one of the plurality of bounding boxes that intersects the at least one of the bounding boxes within which the completely or partially depicted pedestrian has been detected;

eliminate the one of the bounding boxes from the plurality of bounding boxes;

after the one of the bounding boxes is eliminated from the plurality of bounding boxes, determine a feature vector and a distance value of the feature vector by combining image features contained in the plurality of bounding boxes based on multiple statistical distribution models, wherein the image features of one partial portion of a pedestrian or a body of a person is modeled by each of the statistical distribution models;

compare the distance value to a threshold value; and send a signal indicating that a pedestrian has gone undetected if the distance value is less than the threshold value.

12. A non-transitory computer-readable storage medium containing program instructions which, when executed by a processor circuit, cause the processor circuit to:

receive at least one image data set describing an image of an environment of a motor vehicle from at least one environment sensor; and determine a plurality of bounding boxes with one or more potential images of one or more pedestrians using at least one machine learning model (ML model) and the at least one image data set;

extract feature data of image features from image data of the at least one image data set using the at least one ML model;

detect a completely or partially depicted pedestrian within at least one of the a plurality of bounding boxes using the at least one ML model and the image features;

determine one of the plurality of bounding boxes that intersects the at least one of the bounding boxes within which the completely or partially depicted pedestrian has been detected;

eliminate the one of the bounding boxes from the plurality of bounding boxes;

after the one of the bounding boxes is eliminated from the plurality of bounding boxes, determine a feature vector and a distance value of the feature vector by combining image features contained in the plurality of bounding boxes based on multiple statistical distribution models, wherein the image features of one partial portion of a pedestrian or a body of a person is modeled by each of the statistical distribution models;

compare the distance value to a threshold value; and send a signal indicating that a pedestrian has gone undetected if the distance value is less than the threshold value.

* * * * *